(12) United States Patent
Shayko et al.

(10) Patent No.: US 10,888,847 B2
(45) Date of Patent: Jan. 12, 2021

(54) PHOTOCATALYTIC COMPOSITE MATERIAL FOR THE DECOMPOSITION OF AIR POLLUTANTS

(71) Applicant: Envision SQ Inc., Guelph (CA)

(72) Inventors: Scott Shayko, Guelph (CA); Cheng Lu, Mississauga (CA); Xin Qiu, Mississauga (CA)

(73) Assignee: Envision SQ Inc., Guelph (CA)

( * ) Notice: Subject to any disclaimer, the term of this patent is extended or adjusted under 35 U.S.C. 154(b) by 95 days.

(21) Appl. No.: 16/063,921

(22) PCT Filed: Dec. 6, 2016

(86) PCT No.: PCT/CA2016/051431
§ 371 (c)(1),
(2) Date: Jun. 19, 2018

(87) PCT Pub. No.: WO2017/106963
PCT Pub. Date: Jun. 29, 2017

(65) Prior Publication Data
US 2019/0270075 A1    Sep. 5, 2019

(30) Foreign Application Priority Data

Dec. 22, 2015   (CA) ........................... 2916078

(51) Int. Cl.
*B01J 27/08* (2006.01)
*B01D 53/00* (2006.01)
(Continued)

(52) U.S. Cl.
CPC ............ *B01J 27/08* (2013.01); *B01D 53/007* (2013.01); *B01D 53/8628* (2013.01); *B01D 53/8668* (2013.01); *B01D 53/885* (2013.01);

*B01J 19/123* (2013.01); *B01J 19/127* (2013.01); *B01J 21/063* (2013.01); *B01J 21/18* (2013.01);
(Continued)

(58) Field of Classification Search
None
See application file for complete search history.

(56) References Cited

U.S. PATENT DOCUMENTS

2012/0265122 A1* 10/2012 El-Shall ............ A61K 41/0052
604/20
2013/0334145 A1* 12/2013 Gnayem ................ B01J 27/08
502/224
(Continued)

FOREIGN PATENT DOCUMENTS

CN    104014325         9/2014
CN    104014325 A   *   9/2014
(Continued)

OTHER PUBLICATIONS

CN-104014325-A—English translation (Year: 2014).*
(Continued)

*Primary Examiner* — Stefanie J Cohen
(74) *Attorney, Agent, or Firm* — Schwegman Lundberg & Woessner, P.A.

(57) ABSTRACT

The present disclosure relates to a UV- and visible-light photocatalytic titanium dioxide composite material. In particular, the disclosure relates to a 5 photocatalytic titanium oxide composite material for the decomposition of airborne pollutants.

20 Claims, 13 Drawing Sheets

(a)

(b)

(51) Int. Cl.

| | |
|---|---|
| B01D 53/86 | (2006.01) |
| B01D 53/88 | (2006.01) |
| B01J 21/18 | (2006.01) |
| B01J 35/00 | (2006.01) |
| B01J 37/02 | (2006.01) |
| B01J 37/03 | (2006.01) |
| B01J 37/04 | (2006.01) |
| B01J 37/06 | (2006.01) |
| B01J 37/10 | (2006.01) |
| B01J 35/02 | (2006.01) |
| B01J 21/06 | (2006.01) |
| B01J 23/18 | (2006.01) |
| B01J 19/12 | (2006.01) |

(52) U.S. Cl.
CPC ............. *B01J 23/18* (2013.01); *B01J 35/002* (2013.01); *B01J 35/004* (2013.01); *B01J 35/023* (2013.01); *B01J 37/0236* (2013.01); *B01J 37/035* (2013.01); *B01J 37/04* (2013.01); *B01J 37/06* (2013.01); *B01J 37/10* (2013.01); *B01D 2255/2096* (2013.01); *B01D 2255/20707* (2013.01); *B01D 2255/702* (2013.01); *B01D 2255/707* (2013.01); *B01D 2255/802* (2013.01); *B01D 2257/404* (2013.01); *B01D 2257/708* (2013.01); *B01D 2258/01* (2013.01); *B01D 2258/06* (2013.01); *B01D 2259/4591* (2013.01); *B01D 2259/802* (2013.01); *B01D 2259/804* (2013.01); *Y02C 20/10* (2013.01)

(56) References Cited

U.S. PATENT DOCUMENTS

| | | | | |
|---|---|---|---|---|
| 2016/0167991 | A1* | 6/2016 | Sasson | B01J 27/08 502/224 |
| 2016/0346763 | A1* | 12/2016 | Wahab | B01J 21/063 |
| 2016/0367968 | A1* | 12/2016 | Guerrero | B01J 37/345 |

FOREIGN PATENT DOCUMENTS

| | | |
|---|---|---|
| CN | 104353449 A | 2/2015 |
| CN | 104437460 | 3/2015 |
| EP | 1930077 A1 | 6/2008 |
| WO | WO-2009116181 A1 | 9/2009 |
| WO | WO-2014056074 | 4/2014 |
| WO | WO-2017106963 | 6/2017 |

OTHER PUBLICATIONS

Vadivel et al, Graphene oxide—BiOBr composite material as highly efficient photocatalyst for degradation of methylene blue and rhodamine-B dyes, Journal of water process engineering 1, pp. 17-26 (Year: 2014).*

Wang et al, A dye-sensitized visible light photocatalyst-Bi24O31Cl10, Scientific reports, ACSMS2014 (Year: 2014).*

Stroyuk et al, photochemical processes involving graphene oxide, theoretical and experimental chemistry, vo. 51, No. 1, pp. 1-30, Mar. 2015 (Year: 2015).*

"International Application No. PCT/CA2016/051431, International Search Report and Written Opinion dated Mar. 13, 2017", (Mar. 13, 2017), 8 pgs.

Wei, Xian-Xian, et al., "Advanced visible-light-driven photocatalyst BiOBr-TiO2-graphene composite with graphene as a nano-filler", J. mater. Chem. A, vol. 2, 4667-4675, (Jan. 7, 2014), 4667-4675.

"European Application No. 16877041.0, Extended European Search Report dated Jun. 4, 2019", (Jun. 4, 2019), 8 pgs.

Ai, Zhihui, et al., "Efficient Visible Light Photocatalytic Removal of NO with BiOBr-Graphene Nanocomposites", The Journal of Physical Chemistry C, 2011. 115(51): p. 25330-25337, (2011), 25330-25337.

Colon, G., et al., "Cu-doped TiO2 systems with improved photocatalytic activity", Applied Catalysis B, Environmental, 2006. 67(1-2): p. 41-51, (2006), 41-51.

Fang, Jun, et al., "Bifunctional N-Doped Mesoporous TiO2 Photocatalysts", The Journal of Physical Chemistry C, 2008. 112(46): p. 18150-18156, (2008), 18150-18156.

Hua, Xia, et al., "Porous Ag3PO4 microtubes with improved photocatalytic properties", Catalysis Communications, 2014. 52(0): p. 49-52, (2014), 49-52.

Kim, Chan-Soo, et al., "Synthesis and characterization of Cu/Ndoped mesoporous TiO2 visible light photocatalysts", Applied Catalysis A: General, 2013. 455(0): p. 211-218, (2013), 211-218.

Kim, Dong Wook, et al., "Greenlighting Photoelectrochemical Oxidation of Water by Iron Oxide", ACS Nano, 2014. 8(12): p. 12199-12207, (2014), 12199-12207.

Linsebigler, Amy L., et al., "Photocatalysis on Ti02 Surfaces: Principles, Mechanisms, and Selected Results", Chemical Reviews, 1995. 95(3): p. 735-758, (1995), 735-758.

Low, Jingxiang, et al., "Two-dimensional layered composite photocatalysts", Chemical Communications, 2014. 50(74): p. 10768-10777, (2014), 10768-10777.

Lu, Yongtao, et al., "Coupling ZnxCd1-xS nanoparticles with graphene like MoS2: superior interfacial contact, low overpotential and enhanced photocatalytic activity under visible-light irradiation", Catalysis Science & Technology, 2014. 4: p. 2650-2657, (2014), 2650-2657.

Maeda, Kazuhiko, et al., "New Non-Oxide Photocatalysts Designed for Overall Water Splitting under Visible Light", The Journal of Physical Chemistry C, 2007. 111(22): p. 7851-7861, (2007), 7851-7861.

Schneider, Jenny, et al., "Understanding TiO2 Photocatalysis: Mechanisms and Materials", Chemical Reviews, 2014. 114(19): p. 9919-9986, (2014), 9919-9986.

Shang, Jun, et al., "Bismuth Oxybromide with Reasonable Photocatalytic Reduction Activity under Visible Light", ACS Catalysis, 2014. 4(3): p. 954-961, (2014), 954-961.

Spadavecchia, Francesca, et al., "Electronic Structure of Pure and N-Doped TiO2 Nanocrystals by Electrochemical Experiments and First Principles Calculations", The Journal of Physical Chemistry C, 2011. 115(14): p. 6381-6391, (2011), 6381-6391.

Thiruvenkatachari, Ramesh, et al., "A review on UV/TiO2 photocatalytic oxidation process", (Journal Review). Korean Journal of Chemical Engineering, 2008. 25(1): p. 64-72, (2008), 64-72.

Wang, Xinchen, et al., "A metal-free polymeric photocatalyst for hydrogen production from water under visible light", Nat Mater, 2009. 8(1): p. 76-80, (2009), 76-80.

Wu, Qingping, et al., "Selective Photoreduction of Nitric Oxide to Nitrogen by Nanostructured TiO2 Photocatalysts: Role of Oxygen Vacancies and Iron Dopant", Journal of the American Chemical Society, 2012. 134(22): p. 9369-9375, (2012), 9369-9375.

Xu, Xiaoxiang, et al., "A red metallic oxide photocatalyst", Nat Mater, 2012. 11(7): p. 595-598, (2012), 595-598.

* cited by examiner

PHOTOCATALYTIC COMPOSITE MATERIAL FOR THE DECOMPOSITION OF AIR POLLUTANTS

CROSS-REFERENCE TO RELATED APPLICATIONS

This application is a U.S. national stage filing under 35 U.S.C. § 371 from International Application No. PCT/CA2016/051431, filed on Dec. 6, 2016, and published as WO2017/106963 on Jun. 29, 2017, which claims the benefit of Canadian Patent Application No. 2,916,078, filed Dec. 22, 2015, the benefit of priority of each of which is claimed herein, and which applications and publication are hereby incorporated by reference in their entirety.

FIELD

The present disclosure relates to a UV- and visible-light photocatalytic composite material. In particular, the disclosure relates to a photocatalytic composite material for the decomposition of air pollutants.

INTRODUCTION

Nitrogen(II) oxide (NO) and nitrogen(IV) oxide ($NO_2$), together called $NO_x$, are very harmful and poisonous gases emitted primarily from combustion. $NO_x$ has a negative impact on the environment, human and animal health, and plant vegetation. It creates environmental problems including acid rain, photochemical smog, ozone layer depletion, and ecological toxification. Human activity is known to make the largest contribution to total $NO_x$ emissions, mainly from internal and external combustion sources, such as stationary power plants and automobile engines. During combustion, NO is created and can be subsequently oxidized in air to $NO_2$ as shown in the following reactions:

$$N_2 + O_2 \rightarrow 2NO$$

$$NO + \tfrac{1}{2}O_2 \rightarrow NO_2$$

Although traditional techniques such as physical adsorption, biofiltration, and thermal catalysis methods can remove $NO_x$ from industrial emission, they are not economically feasible for the removal of NO at parts per billion (ppb) levels.

Semiconductor-based photocatalysts such as $TiO_2$ have been widely studied to remove the organic pollutants in the liquid and gas phases[1-3]. Upon illumination with light, photocatalysts release highly reactive photogenerated electron/hole pairs that can degrade surface-adsorbed species. Photocatalytic reactions do not consume extra chemicals or energy except for sunlight; as a result, they are considered the greenest method in combating airborne pollutants.

Photocatalytic reactions can undergo either an oxidization or reduction process. In the oxidation process, $NO_x$ is oxidized to higher oxidation state nitrogen oxides by photogenerated holes and other intermediate free radicals as the following equations shows:

$$\text{Photocatalysts} + h\nu \rightarrow e_{CB}^- + h_{VB}^+$$

$$h_{VB}^+ + H_2O_{ads} \rightarrow HO_{ads} \cdot + H^+$$

$$e_{CB}^- + O_{2\,ads} \rightarrow O_{2ads}^{\cdot -}$$

$$NO + 3HO_{ads} \cdot \rightarrow HNO_3 + H_2O$$

$$NO_2 + HO_{ads} \cdot \rightarrow HNO_3$$

$$NO + O_{2ads}^{\cdot -} \rightarrow NO_3^-$$

However, the $HNO_3$ and $NO_3^-$ species generated from photocatalytic oxidation processes are hard to desorb, which will lower the photocatalytic stability. They also generate acid rain that is harmful to the environment.

Photocatalytic reduction or photodecomposition of $NO_x$ is the reaction which occurs at the surface of the photocatalyst, and follows the equations below:

$$\text{Photocatalysts} + h\nu \rightarrow e_{CB}^- + h_{VB}^+$$

$$O^{2-}(\text{surf}) + h_{VB}^+ \rightarrow O^-(\text{surf})$$

$$NO(\text{ads}) + e_{CB}^- \rightarrow NO^-(\text{ads})$$

$$NO^-(\text{ads}) + O^-(\text{surf}) \rightarrow N(\text{ads}) + O(\text{ads}) + O^{2-}(\text{ads})$$

$$2N(\text{ads}) \rightarrow N_2(\text{ads}) \rightarrow N_2(\text{gas})$$

$$2O(\text{ads}) \rightarrow O_2(\text{ads}) \rightarrow O_2(\text{gas})$$

In this process, photogenerated electrons reduce surface adsorbed $NO_x$, and holes oxidize the surface $O^{2-}$. This process finally leads to a simple reaction:

$$2NOx \xrightarrow{h\nu, \text{photocatalyst}} N_2 + \tfrac{x}{2}O_2$$

The formed $N_2$ and $O_2$ are completely environmentally benign, and they desorb from the surface in a fast approach, as a result, this process will not diminish the long term photocatalytic stability.

The $TiO_2$ photocatalyst is one of the mostly studied catalysts, but the relatively large bandgap of 3.2 eV limits its application to within the UV range of light, which only accounts for ~4% of solar energy. To better utilize the solar energy in the visible range and to increase the photocatalytic efficiency, many catalyst systems have been widely studied. Common approaches include: cation/anion doping in $TiO_2$ photocatalyst[4-8], developing new visible light photocatalyst materials[9-14], and 2D photocatalyst systems for high photocatalytic efficiency[15-17]. Wei[18], for example, discloses a photocatalyst for the treatment of water in which amorphous $TiO_2$ and BiOBr are randomly deposited on graphene, and the graphene is freely distributed. Wei's material has an absorption edge of approximately 420 nm.

SUMMARY

The present disclosure relates to a UV- and visible-light photocatalytic titanium dioxide composite material. In particular, the disclosure relates to a UV- and visible-light photocatalytic titanium oxide composite material for the decomposition of air pollutants. Upon exposure to visible light and/or sunlight, the photocatalytic material decomposes airborne pollutants to less harmful by-products.

Accordingly, in one embodiment of the disclosure, there is provided a UV- and visible-light photocatalytic composite material, comprising
 a) crystalline titanium dioxide;
 b) graphene oxide; and
 c) a bismuth-oxy halide of the formula Bi—O—X, wherein X is chloro, bromo, or iodo.

In another embodiment, the present disclosure also includes a UV- and visible-light photocatalytic composite material, comprising
 a) titanium dioxide;
 b) a first composite material, comprising
  i) graphene oxide; and
  ii) a bismuth-oxy halide of the formula Bi—O—X, wherein X is chloro, bromo or iodo.

The present disclosure further includes a use of the UV- and visible-light photocatalytic composite material for the decomposition of airborne pollutants, such as $NO_x$ and volatile organic compounds.

As the composite materials of the present disclosure have the ability to decompose airborne pollutants, such as $NO_x$ and VOCs, upon exposure to visible light or sunlight, the present disclosure also includes a method for the decomposition of airborne pollutants, such as $NO_x$ and VOCs, optionally under environmental conditions.

Other features and advantages of the present application will become apparent from the following detailed description. It should be understood, however, that the detailed description and the specific examples while indicating embodiments of the application are given by way of illustration only, since various changes and modifications within the spirit and scope of the application will become apparent to those skilled in the art from this detailed description.

DRAWINGS

The present application will now be described in greater detail with reference to the drawings in which.

Figure 1:
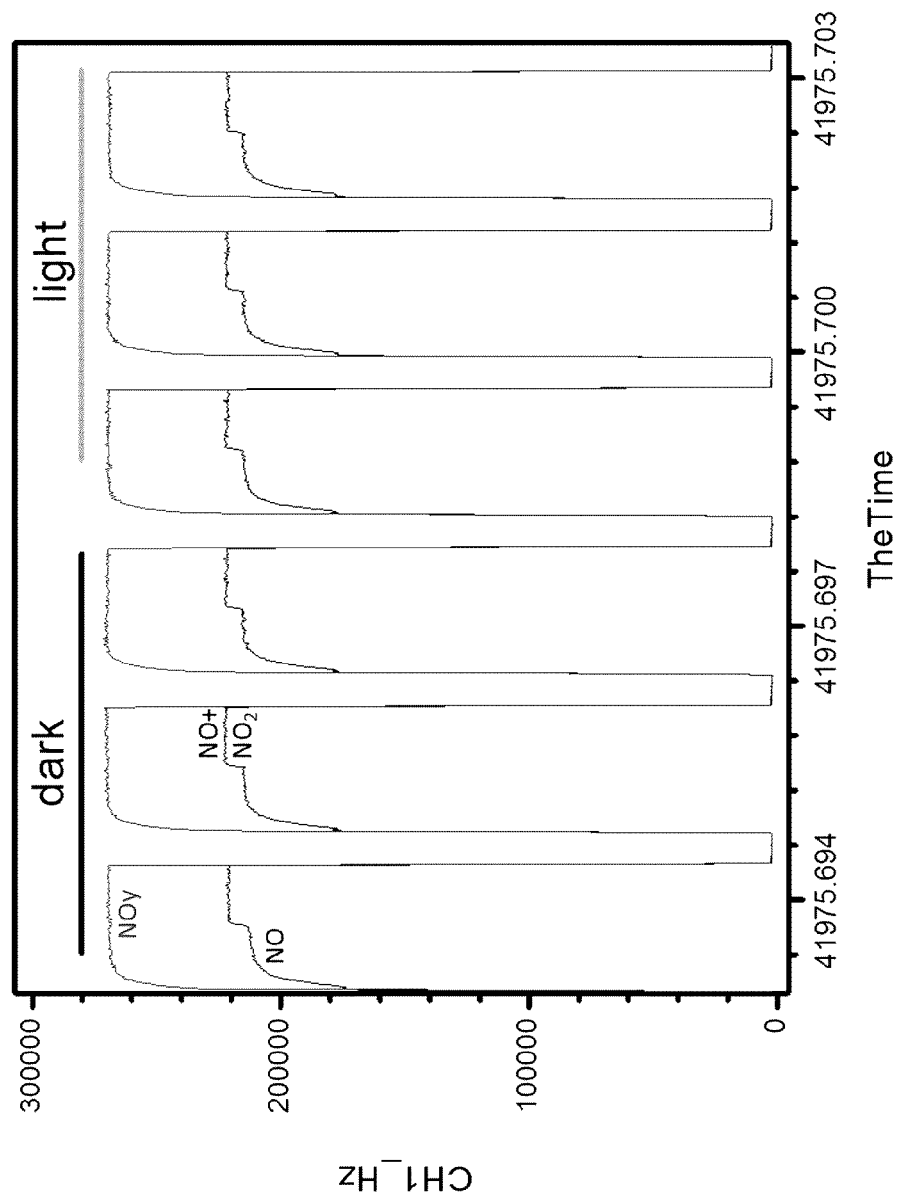
FIG. 1 is a graph showing $NO_x$ and $NO_y$ tracers in the dark and under light illumination without photocatalyst coating.

FIG. 12(a) is a photo of a composite material of the disclosure; FIG. 12(b) is a UV-Vis diffuse absorption spectrum of a composite of the disclosure; and FIG. 13(a) is a graph showing average NO, $NO_2$, and $NO_y$ count traces during 6 hours light illumination for a composite of the disclosure; FIG. 13(b) is a graph showing NO, $NO_2$, and $NO_y$ conversion rates during 6 hours light illumination for a composite of the disclosure.

DESCRIPTION OF VARIOUS EMBODIMENTS (I) Definitions

The term "visible light" as used herein refers to light having wavelength(s) between about 400 nm and about 750 nm. Not all wavelengths in this range need to be present in the "visible light" for the decomposition of the airborne pollutants by the photocatalytic composite material.

The term "UV light" as used herein refers to ultraviolet light with a wavelength of about 200 nm to about 400 nm. Not all wavelengths in this range need to be present in the "UV light" for the decomposition of the airborne pollutants by the photocatalytic composite material.

The term "photocatalytic" as used herein, refers to the ability of a composite material of the disclosure to absorb light energy (UV and visible) to decompose airborne pollutants, such as nitrogen oxides and/or VOCs, to less harmful by-products, such as $N_2$.

The term "composite material" as used herein refers to a material in which two or more distinct substances combine to produce structural or functional properties not present in any individual component.

The term "titanium dioxide" as used herein refers to an oxide of titanium with a chemical formula of $TiO_2$, and includes all phases of titanium in all ratios, including anatase, rutile, and brookite phases.

The term "graphene" as used herein refers to a polycyclic aromatic molecule comprising a plurality of carbon atoms connected to each other by a covalent bond. The plurality of carbon atoms may form six-membered rings as a standard repeating unit, or may further include 5-membered rings and/or 7-membered rings. Accordingly, the graphene may be a single layer of covalently bonded carbon atoms having generally $sp^2$ hybridization.

The term "graphene oxide" as used herein refers to graphene with one or more oxide groups present on the surface of the graphene.

The term "absorption edge", as used herein refers to a wavelength around which an abrupt rise in the absorption capability arises.

The term "$NO_x$" as used herein, refers to one, or a mixture of two or more nitrogen oxides, including NO, and $NO_2$, and the like formed, for example, during typical combustion processes.

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having"

and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless the content clearly dictates otherwise. For example, an embodiment including "a compound" should be understood to present certain aspects with one compound or two or more additional compounds.

(II) UV- and Visible-Light Photocatalytic Composite Material

The present disclosure relates to UV- and visible-light photocatalytic titanium dioxide composite materials. In particular, the disclosure relates to a photocatalytic titanium oxide composite material for the decomposition of air pollutants, such as $NO_x$ and VOCs. Upon exposure to UV light, visible light and/or sunlight, the photocatalytic material decomposes airborne pollutants to less harmful by-products. The photocatalytic composite materials of the present disclosure are efficient catalysts for the decomposition of airborne pollutants, such as $NO_x$, and also have good stability as they maintain efficient levels of catalysis after many hours of catalysis.

In one embodiment therefore, the present disclosure is directed to a UV and/or visible-light photocatalytic composite material, comprising
  i) titanium dioxide; and
  ii) a first composite material comprising
    a) graphene oxide; and
    b) a bismuth-oxy halide of the formula Bi—O—X, wherein X is chloro, bromo or iodo.

In one embodiment, the photocatalytic composite material has a UV-vis absorption edge of about 470 nm.

In another embodiment, the titanium dioxide is deposited on the first composite.

In one embodiment, the titanium dioxide and the first composite material are present in a weight ratio of between about 0.5:1 to about 3:1. In a further embodiment, the titanium dioxide and the first composite material are present in a weight ratio of about 1:1.

In another embodiment, the titanium dioxide is present in an amount between about 40-80% (w/w), or about 40-60% (w/w), or about 50% (w/w) of the total photocatalytic composite material. In another embodiment, the bismuth-oxy halide is present in an amount between about 20-60% (w/w), or about 30-50% (w/w), of the total photocatalytic composite material. In a further embodiment, the graphene oxide is present in an amount between about 0.1-1.0% (w/w), or about 0.1-0.5% (w/w), or about 0.5% (w/w) of the total photocatalytic composite material.

In one embodiment, the titanium dioxide is crystalline titanium dioxide. In one embodiment, the titanium dioxide comprises anatase, rutile and/or brookite phases. In a further embodiment, the titanium dioxide comprises anatase and rutile phases, optionally present in a ratio of about 3:1 (anatase:rutile) (w/w). For example, the titanium dioxide is Aeroxide®.

In another embodiment of the disclosure, the bismuth oxyhalide is bismuth-oxybromide. In one embodiment, the bismuth oxyhalide is bismuth-oxychloride.

In one embodiment, the first composite material comprises graphene oxide and bismuth-oxybromide.

In another embodiment of the disclosure, the graphene oxide is partially reduced graphene oxide which comprises graphene oxide and graphene (i.e., a mixture of graphene and graphene oxide).

In one embodiment, the photocatalytic composite material comprises crystalline titanium dioxide, and a first composite material comprising graphene oxide and bismuth-oxybromide.

In another embodiment, the present disclosure also includes a UV and/or visible-light photocatalytic composite material, comprising
  a) crystalline titanium dioxide;
  b) graphene oxide; and
  c) a bismuth-oxy halide of the formula Bi—O—X, wherein X is chloro, bromo or iodo.

In one embodiment, the crystalline titanium dioxide comprises anatase, rutile and/or brookite phases. In a further embodiment, the crystalline titanium dioxide comprises anatase and rutile phases, optionally present in a ratio of about 3:1 (anatase:rutile) (w/w). For example, the titanium dioxide is Aeroxide®.

In another embodiment, the titanium dioxide is present in an amount between about 40-80% (w/w), or about 40-60% (w/w), or about 50% (w/w) of the total photocatalytic composite material. In another embodiment, the bismuth-oxy halide is present in an amount between about 20-60% (w/w), or about 30-50% (w/w), of the total photocatalytic composite material. In a further embodiment, the graphene oxide is present in an amount between about 0.1-1.0% (w/w), or about 0.1-0.5% (w/w), or about 0.5% (w/w) of the total photocatalytic composite material.

In another embodiment of the disclosure, the bismuth oxyhalide is bismuth-oxybromide. In another embodiment, the bismuth oxyhalide is bismuth-oxychloride.

In another embodiment of the disclosure, the graphene oxide is partially reduced graphene oxide comprising graphene oxide and graphene (i.e., a mixture of graphene and graphene oxide.

In one embodiment, the photocatalytic composite material comprises crystalline titanium dioxide, graphene oxide and bismuth-oxybromide.

The composite material of the present disclosure can be formulated into compositions for application to surfaces, for example, where there is a need or desire to reduce airborne pollutants. In one embodiment therefore, the present disclosure includes compositions comprising a photocatalytic composite material as disclosed herein, and a solvent suitable to disperse the composite material. In one embodiment, the solvent is a $C_1$-$C_6$-alcohol (such as methanol, ethanol, isopropanol, etc.), water, or a mixture thereof.

(III) Uses and Methods for the Decomposition of Airborne Pollutants

The composite materials of the present disclosure are efficient photocatalysts for the decomposition of airborne pollutants, such as $NO_x$. Accordingly, in one embodiment, the present disclosure includes a use of a UV- and/or visible-light photocatalytic composite material as disclosed herein for the decomposition of airborne pollutants. In one embodiment, the airborne pollutant is $NO_x$ and/or volatile organic compounds (VOCs). Upon exposure of the photocatalytic materials to visible light or sunlight, the composite materials catalyze the decomposition of the airborne pollutants.

The present disclosure also includes a method for the decomposition of airborne pollutants, comprising
a) applying a UV- and/or visible-light photocatalytic composite material as disclosed herein to a suitable surface;
b) exposing the suitable surface to UV light, visible light or sunlight for the decomposition of the airborne pollutant,
wherein the airborne pollutant is $NO_x$ or a volatile organic compound.

In one embodiment, the UV- and/or visible-light photocatalytic composite material is formulated as a liquid composition, for example, in a suitable solvent (such as ethanol, water, or mixtures thereof), and the composition is applied (such as sprayed) on the suitable surface.

In one embodiment, the suitable surface is any surface for which there is a need or desire for the decomposition of airborne pollutants in the immediate environment. For example, the composite material may be applied to any of the following surfaces: roadways, tunnels, walls, concrete, pavement, asphalt, automobiles etc. The composite materials of the present disclosure may also be used in combination with other pollution control measures. For example, PCT Publication no. WO2014056074 describes an apparatus and method for controlling airborne pollution, comprising leeward and windward walls which direct airflow through a passageway. The composite materials of the present disclosure may be applied to the walls of the apparatus disclosed in this publication for the reduction of airborne pollutants.

The exposure of the suitable surface to visible light or sunlight in step (b) above may either be a passive step or an active step. For example, when the composite material of the present disclosure is applied to a surface such as a pollution control apparatus as described in WO2014056074, or a roadway etc., natural sunlight will begin the photocatalytic process when the surface is exposed to natural sunlight (i.e. daytime). Alternatively, the suitable surface may be exposed to visible or UV-light from artificial light sources, for example, light bulbs. For example, the photocatalytic composite material may be applied to an air filter in an automobile, house or building for the reduction of airborne pollutants entering the automobile or structure. To activate the photocatalytic composite material on the air filter, the air filter surface is exposed to an artificial light source and the photocatalytic composite material catalyzes the decomposition of airborne pollutants flowing through the air filter. Other suitable surfaces include window screens, windows etc.

Alternatively, the composite material of the present disclosure may be mixed with another chemical composition for application to a suitable surface. For example, the composite material may be added to a paint, stain, lacquer, varnish or any other coating, for application to walls or floors, etc., and which can then decompose airborne pollutants.

As the catalytic decomposition of the airborne pollutant proceeds, by-products may be adsorbed on the surface of the composite material lessening the efficiency of the composite material. The activity of the composite material can be returned to maximum efficiency after a period in which the material is not exposed to visible light, and the byproducts desorb from the composite surface. For example, when the composite material is applied to the pollution control apparatus described in WO2014056074, the absence of sunlight (e.g. nighttime) results in the composite material returning to its maximum catalytic efficiency.

In another embodiment, the photocatalytic composite materials of the present disclosure are efficient catalysts for the decomposition of airborne pollutants, and maintain a high level of activity after hours of catalytic decomposition. For example, after about 4-8 hours, or about 6 hours of photocatalysis, the photocatalytic composite materials have a reduction in their efficiency of about 30%.

(IV) Process for Preparing the Composite Material

The present disclosure also includes processes for the preparation of the UV- and visible-light photocatalytic composite material as described herein.

In one embodiment, the process includes the following steps:
i) mixing a bismuth containing compound in a suitable solvent to form a solution;
ii) adding a halide containing compound to the solution to form a suspension;
iii) adding graphene oxide to the suspension;
iv) hydrothermally treating the suspension to form the first composite material;
v) thermally treating titanium dioxide;
vi) mixing the first composite material and the titanium dioxide in an aqueous solution;
vii) hydrothermally treating the aqueous solution to obtain the photocatalytic composite material In one embodiment, the bismuth containing compound is bismuth nitrate, for example, bismuth nitrate pentahydrate.

In another embodiment, the suitable solvent is water, an alcohol (such as ethanol) or glycol, such as ethylene glycol.

In another embodiment, the bismuth containing compound is bismuth trinitrate, for example, a bismuth trinitrate pentahydrate.

In another embodiment, the halide containing compound is cetyltrimethylammonium bromide is mixed with the solution to form a precipitate.

In another embodiment, the suspension is hydrothermally treated at a temperature of between about 150° C. to about 250° C., or about 180° C. In one embodiment, the suspension is hydrothermally treated for a period of between about 1-24 hours, or about 6-18 hours, or about 12 hours.

In another embodiment, the titanium dioxide is thermally treated at a temperature of between about 200° C. to about 600° C., or about 300° C. In one embodiment, the titanium dioxide is thermally treated for a period of between about 30 minutes and 5 hours, or about 1-3 hours, or about 1 hour.

In one embodiment, the titanium dioxide is crystalline titanium dioxide. In one embodiment, the titanium dioxide comprises one or more crystalline phases including anatase, rutile and brookite. In a further embodiment, the titanium dioxide comprises anatase and rutile phases, optionally present in a ratio of about 3:1 (anatase:rutile) (w/w). For example, the titanium dioxide is Aeroxide®.

In a further embodiment, the aqueous solution is hydrothermally treated at a temperature between about 100° C. to about 200° C., or about 120° C. In one embodiment, the aqueous solution is hydrothermally treated for a period of between about 1-5 hours, or about 1-3 hours, or about 2 hours.

The following non-limiting examples are illustrative of the present application:

EXAMPLES

Example 1: Synthesis of Photocatalytic Material

Procedure (a)

0.485 g $Bi(NO_3)_3$ $5H_2O$ was dissolved in 35 ml ethylene glycol (EG) solution to obtain a transparent solution. 0.364 g CTAB was added into this solution under strong magnetic stirring, to form a whitish precipitate. The formed suspension was stirred for over 30 minutes. 35 ml ethanol solution containing graphene oxide (GO) (0.75 ml 2 mg/ml GO solution) was added into above suspension and was stirred for another 60 minutes. This suspension was transferred to a 100 ml Teflon-lined autoclave, and hydrothermally treated at 180° C. for 12 hours. The precipitate was collected and washed with ethanol and deionized water thoroughly and dried at 50° C. under vacuum. Approximately 0.3 g BiOBr/GO was obtained as a greyish powder $TiO_2$—P25 was thermally treated at 300° C. for 1 hour before use. 1 g of synthesized powder BiOBr/GO, and 1 g of $TiO_2$ P25 were mixed and dispersed into a 50 ml $H_2O$ solution under magnetic stirring for 4 hours. The suspension was then transferred to a 100 ml Teflon-lined autoclave and hydrothermally treated at 120° C. for 2 hours. The precipitate was then collected, washed with water and dried at 100° C. to obtain the final greyish product, BiOBr/GO—$TiO_2$.

10 g of BiOBr/GO—$TiO_2$ was dispersed into 1 L water/ethanol (Vol: 40/60) mixture solvent, stirring and sonicated for 2 hours to get stable greyish suspension solution for coating applications.

The coating recommended ratio is >=1 g/m$_2$, depending on transparent requirement.

Procedure (b)

1.46 g of $Bi(NO_3)_3.5H_2O$ was dissolved in 35 ml ethylene glycol to obtain a transparent solution. 1.12 g CTAB was then added into this solution under strong magnetic stirring, to form whitish a precipitate. The formed suspension was stirred for over 30 minutes. 35 ml of an ethanol solution containing graphene oxide (2.25 ml 2 mg/ml GO solution) was then added into the above suspension and was stirred for another 60 minutes. The suspension was transferred to a 100 ml Teflon-lined autoclave, and hydrothermally treated at 180° C. for 12 hours. This reaction is repeated to obtain more BiOBr/GO powder. All solutions were collected together and the precipitate was collected and washed with ethanol and deionized water thoroughly and dried at 50° C. under vacuum. The total procedure formed 25 g of greyish powder BiOBr/GO.

30 g of $TiO_2$—P25 was thermally activated at 300° C. for 1 hour. 2.5 g of BiOBr/GO and 2.7 g of $TiO_2$ P25 were mixed and dispersed into a 50 ml $H_2O$ solution under magnetic stirring for 4 hours. The suspension was transferred to a 100 ml Teflon-lined autoclave and hydrothermally treated at 120° C. for 2 hours. This procedure was repeated 10 times.

All of the suspension solutions were collected together. The precipitate was separated using centrifugation at 7500 rpm for 15 minutes, washed by water and dried at 100° C. under vacuum to obtain the final greyish product BiOBr/GO—$TiO_2$ (~24 g).

To clean the product, 1 g of composite powder was washed twice with 60 grams of ethanol, and subsequently, 100 grams of water, followed by centrifugation at 7500 rpm for 15 minutes after each wash to separate the powder.

Example 2: $NO_x$ Measurement

Nitrogen oxides were measured by a dual channel chemiluminescence instrument from Air Quality Design Inc. Chemiluminescence allows the detection of a very low concentration of NO, specifically sensitive to NO. When an excess of ozone is present, NO gas is oxidized and emits light between 600 nm to 3000 nm that can be detected photo-electronically.

$$NO+O_3 \rightarrow NO_2^* + O_2$$

$$NO_2^* \rightarrow NO_2 + h\gamma$$

The intensity of the signal is proportional to the concentration of NO. Normally, the sample gas contains both NO and $NO_2$. To measure the $NO_2$ in the sample gas, $NO_2$ has to be reduced to NO by passing the sample flow through a hot molybdenum oxide converter (MoC) at a set temperature of 300° C. This gives the concentration of $NO_x$ ($NO+NO_2$). This instrument also enables the analysis of the total nitrogen oxides (NOy) species such as $N_2O_3$, $N_2O_5$ etc. through the secondary channel.

The $NO_x$ analyzer was first calibrated by using a known concentration of NO (4.75 ppb) on a daily basis. The ambient background was collected in each measurement step. The NO gas source concentration was 50 ppm. The input gas was 100 ppb NO obtained by diluting the concentrated NO with dry zero air at a flow rate of 1 L/min. The light source was a 3 KW Xeon lamp equipped with water cooling tube to remove IR illumination, and a glass filter to remove the light with wavelengths shorter than 350 nm and to better simulate the sunlight reaching the ground. The reaction chamber was a 3 L air tightened box with a quartz window on top. 10 mg of photocatalyst powder was dispersed into 20 ml ethanol, and then sprayed onto the 4×4 cm$^2$ acrylic sheet to form the photocatalyst coatings. The photocatalyst coating on acrylic sheet was then placed at the bottom of the sample chamber. The area of the acrylic exposed to light was a circle 3 cm in diameter, and the light intensity was 35 mW/cm$^2$, which corresponded to the average sun light intensity at 11 am in Toronto during the winter season First, a blank experiment was carried out to investigate the effect of light on the NOx conversion efficiency, and the results are shown in FIG. 1. The instrument response time was 1 spot/second. During the measurement, to better average the data and take into account gas flow time, each measurement cycle took 2.5 minutes and was followed by a 30-second-relaxation measurement relating to the background signal. The $NO_x$ analyzer collected the signals from $NO_x$ and $NO_y$ through two channels. The black line is the signal from $NO_x$. During the first half of the time of the collecting step, the signal was caused by the NO in the input gas. During the second half of the step, the input gas was passed through MoC to reduce the $NO_2$ into NO, and the signal was related to the $NO_x$ ($NO+NO_2$). A small increase due to the contribution from $NO_2$ is visible when the measurement process was changed. The red line is the signal for $NO_y$. The first three cycles in FIG. 1 were measured in the dark, and the next three cycles were measured under light illumination. All of these cycles were identical, indicating the light illumination does not affect the $NO_x$ conversion efficiency in the measurement.

Figure 2:
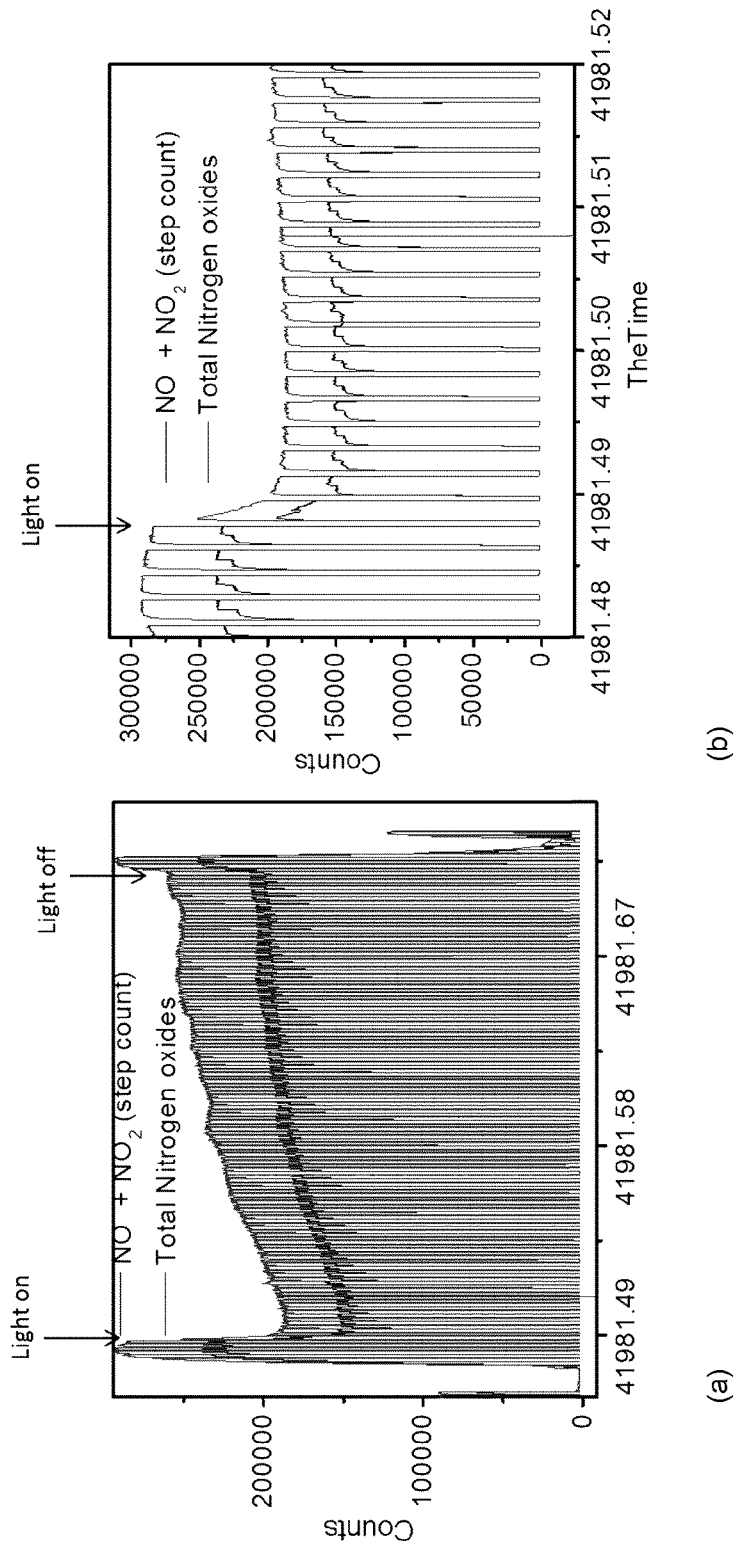
FIG. 2 are graphs showing photocatalytic decomposition of $NO_x$ on $TiO_2$ P25 catalyst coating. (a) $NO_x$ and $NO_y$ count traces in the 6 hour time range. (b) Closer view of $NO_x$ and $NO_y$ traces at the beginning of light illumination.

The data collected from $TiO_2$ P25 coating were used to demonstrate the data treatment process. FIG. 2 (a) shows the photoelectronic counts collected from the analyzer in a 6 hour period. To demonstrate more clearly, the first 25 steps are shown in FIG. 2 (b). Because the number of the photoelectronic counts is in a linear relation with the concentration of NO, three pieces of information can be obtained from the data: The concentrations of NO, $NO_x$ and $NO_y$ can be obtained based on the average of photoelectronic counts of the measured sample and calibrated samples. This can be described by the equation below:

$$C_{NO} = \frac{n_{measure} - n_{bg}}{N_{cal} - n_{bg}} * C_{cal}$$

where $n_{measure}$ is the measured number of counts, $n_{bg}$ is the number of counts from the background, $n_{cal}$ is the number of counts from the calibrated gas, and $C_{cal}$ is the calibrated gas concentration, which was 4.75 ppb in this experiment. The number of counts $n_{measure}$, $n_{bg}$, and $n_{cal}$ were taken from the average value when the measurement reached a stable state. In general, 30 points were averaged in NO and $NO_x$ counts, and 120 points were averaged for $NO_y$. In the following part of the report, only the extracted average counts of NO, $NO_2$ and $NO_y$ are used, and the converted concentration ratios c/co are graphed and presented.

Example 3—Prior Art Catalysts (i) $TiO_2$ P25 Photocatalyst

Commercially available Aeroxide®, $TiO_2$—P25, was obtained from Sigma-Aldrich®. The sample was baked at 100° C. for 12 hours before applied for coating applications. $TiO_2$ P25 was easily dispersed into solvents such as water an ethanol to form a milky suspension without further treatment.

Figure 3:
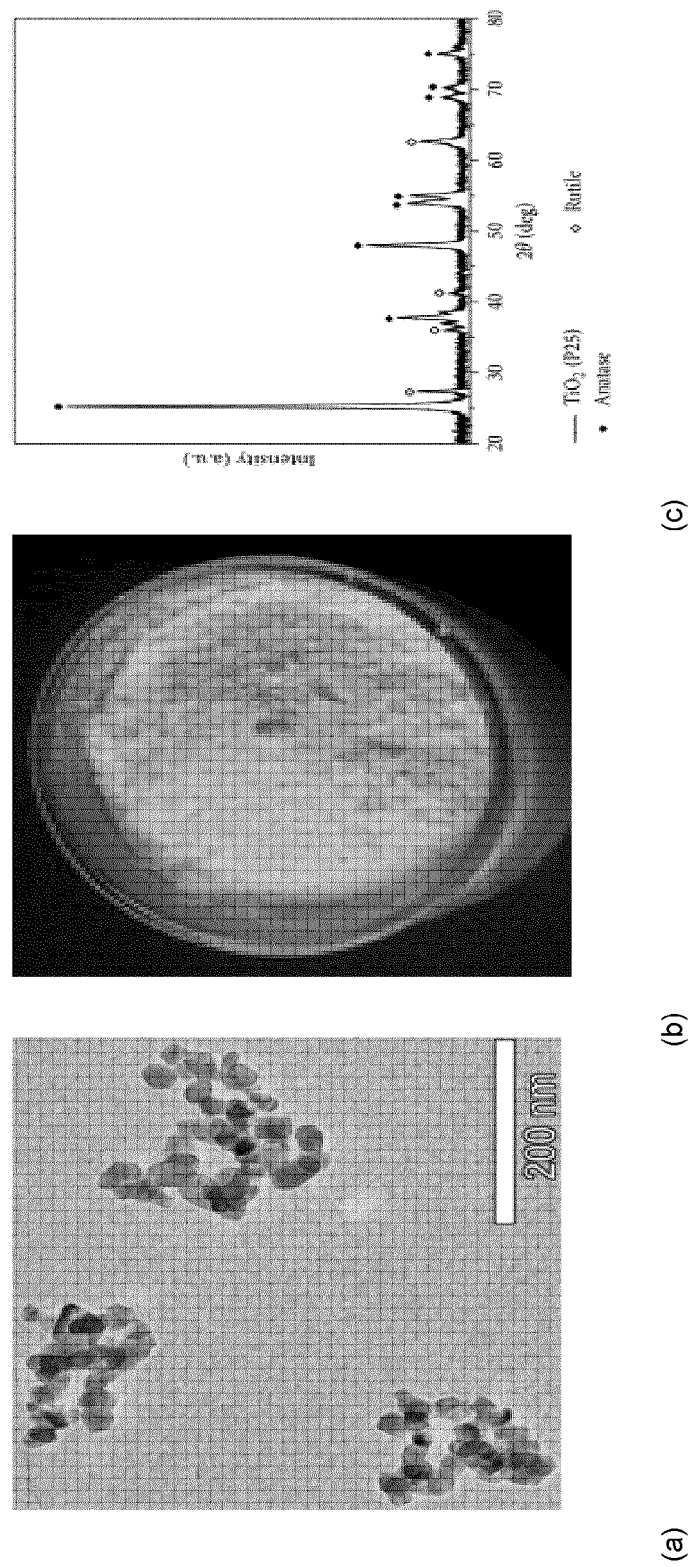
FIG. 3(a) is a transmission electron micrograph (TEM) of $TiO_2$ P25.
FIG. 3(b) is a photo of $TiO_2$ P25.
FIG. 3(c) is an XRD spectrum of $TiO_2$ P25.
Figure 4:
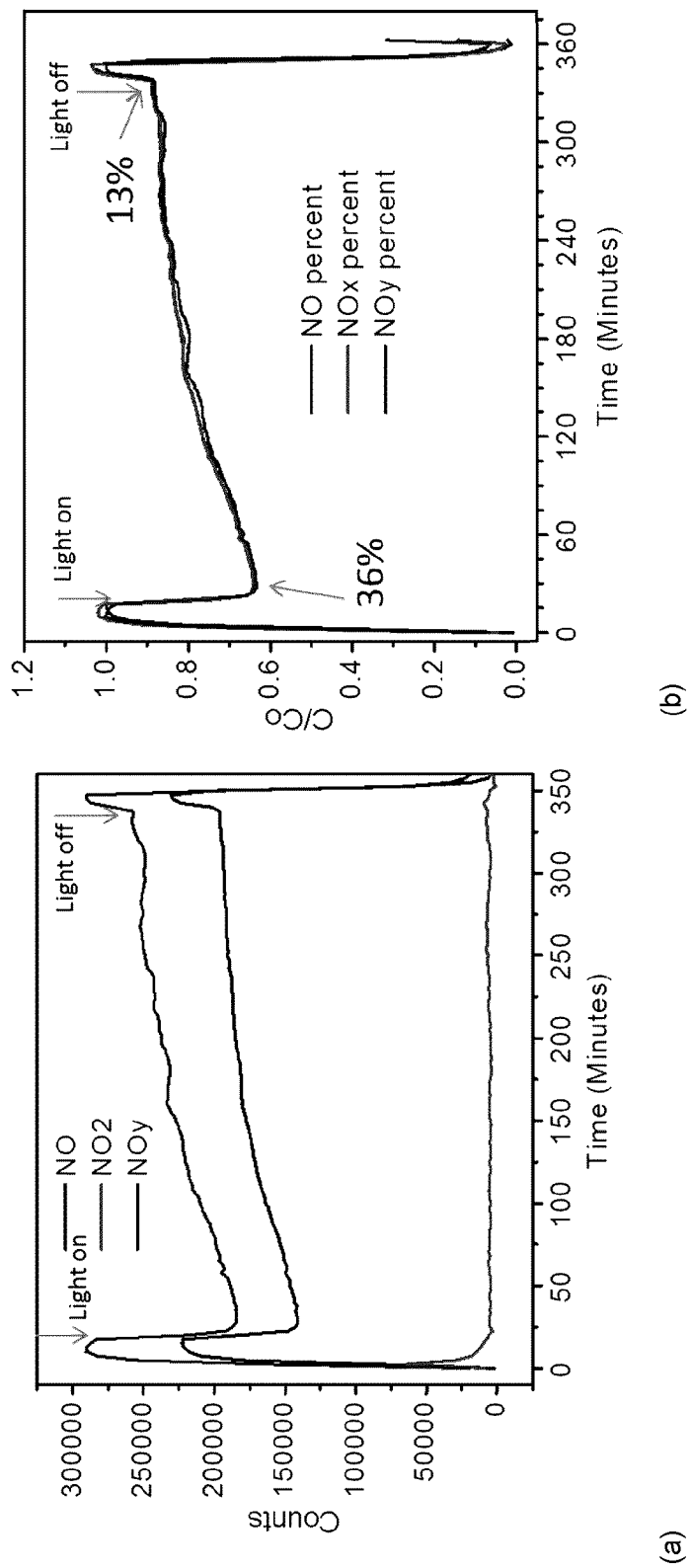
FIG. 4(a) is a graph showing average NO, $NO_2$, and $NO_y$ count traces during 6 hours light illumination for $TiO_2$ P25.
FIG. 4(b) is a graph showing NO, $NO_2$, and $NO_y$ conversion rate during 6 hours light illumination for $TiO_2$ P25.

FIGS. 3 and 4 show the characterization of the $TiO_2$ P25 photocatalyst and its photocatalytic results on $NO_x$ decomposition. FIG. 3(a) is a TEM image shows the $TiO_2$ P25 nanoparticles are in the size range around 20 nm. FIG. 3(b) shows that $TiO_2$ P25 is a white powder, suggesting its non-absorption in the visible light range. Finally, FIG. 3(c) is an XRD spectrum, which demonstrates that $TiO_2$—P25 has both anatase and rutile phases.

FIGS. 4(a) and (b) shows both $NO_x$ and $NO_y$ signals exhibited a prompt drop upon light illumination, and the signals recovered to the original value once the light was off, confirming the photocatalytic capability of $TiO_2$ P25.

FIG. 2(b) shows, once the light was switched on, it took both $NO_x$ and $NO_y$ signal 3-4 cycles to the balanced state, mainly because of the gas transport time from the reaction chamber to the detector.

FIG. 4(a) shows that the $NO_x$ and $NO_y$ signal slowly increased with the increase of light illumination time, indicating the poor photocatalytic stability of the $TiO_2$ P25 coating.

FIG. 4(b) converts the photoelectronic counts to concentration ratio (c/co). The data demonstrates that ~36% of NO, $NO_2$ and $NO_y$ were decomposed upon light illumination. However, this ratio decreased as the illumination time increased; after 6 hours of light illumination, the photocatalytic decomposition ratio dropped to ~13%. This is possibly due to the slow desorption of adsorbed gas molecules at the $TiO_2$ surface.

$TiO_2$ P25 is effective for $NO_x$ removal, but with poor photocatalytic stability, would not be an ideal candidate for long term exterior coating applications.

(ii) BiOBr/GO Photocatalyst 0.1 mmol $Bi(NO_3)_3$ $5H_2O$ (0.0485 g) was added into 35 ml of ethylene glycol containing stoichiometric amounts of cetyltrimethylammonium bromide (CTAB) (0.0364 g) to form a suspension. The suspension was stirred for 30 minutes. 35 ml of an ethanol solution containing graphene oxide obtained from Sigma-Aldrich® (0.35 ml 2 mg/ml GO solution) was added into the suspension and stirred for another 60 minutes. The suspension was then transferred to a 100 ml Teflon-lined autoclave, and hydrothermally treated at 180° C. for 12 hours. The precipitation was then collected and washed with ethanol and deionized water thoroughly and dried at 50° C. in air.

Figure 5:
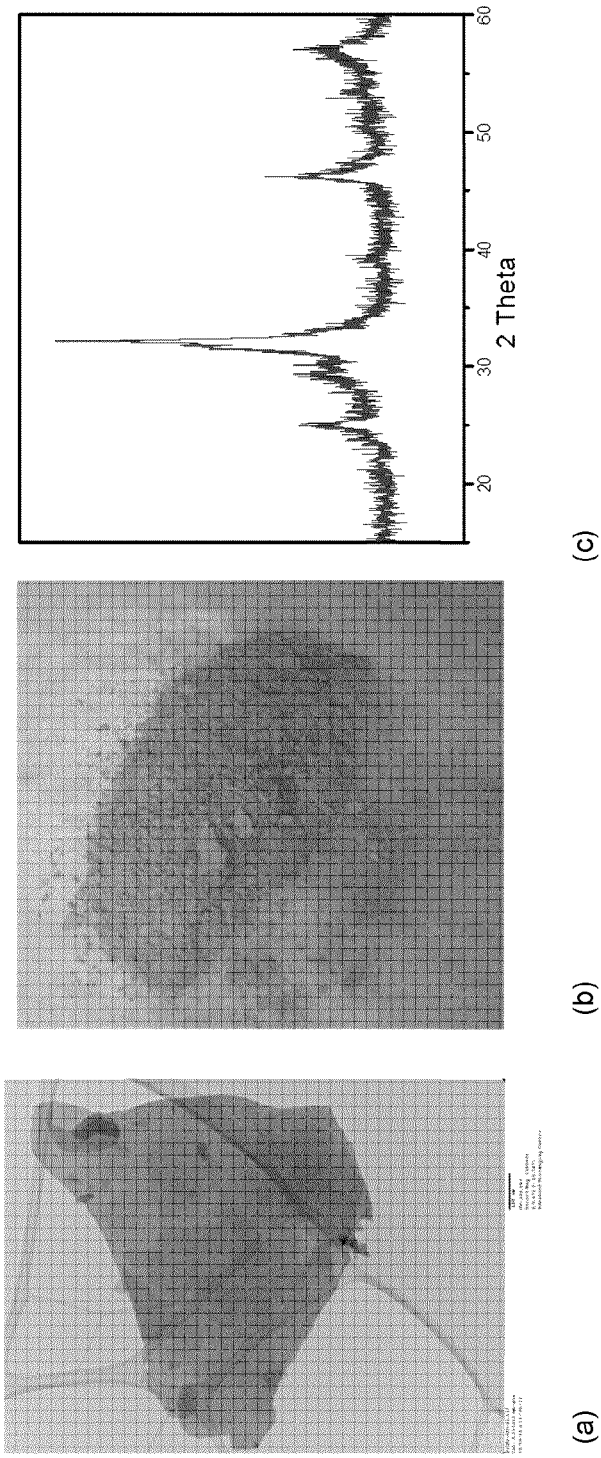
FIG. 5(a) is a transmission electron micrograph (TEM) of BiOBr/GO.
FIG. 5(b) is a photo of BiOBr/GO.
FIG. 5(c) is an XRD spectrum of BiOBr/GO.

The TEM image shown in FIG. 5(a) shows that small pieces of BiOBr (~20-30 nm) were dispersed on 2D graphene sheets. 2D graphene has excellent electronic conductivity and is expected to promote efficient photogenerated charge separation, and therefore improve the photocatalytic efficiency. As shown in FIG. 5(b), the fabricated composite shows a grey color, suggesting the absorption of visible light. As shown in FIG. 5(c), XRD results show a typical BiOBr diffraction pattern, but no diffraction peaks due to graphene were observed, possibly due to the low ratio of GO inside the composite.

Figure 6:
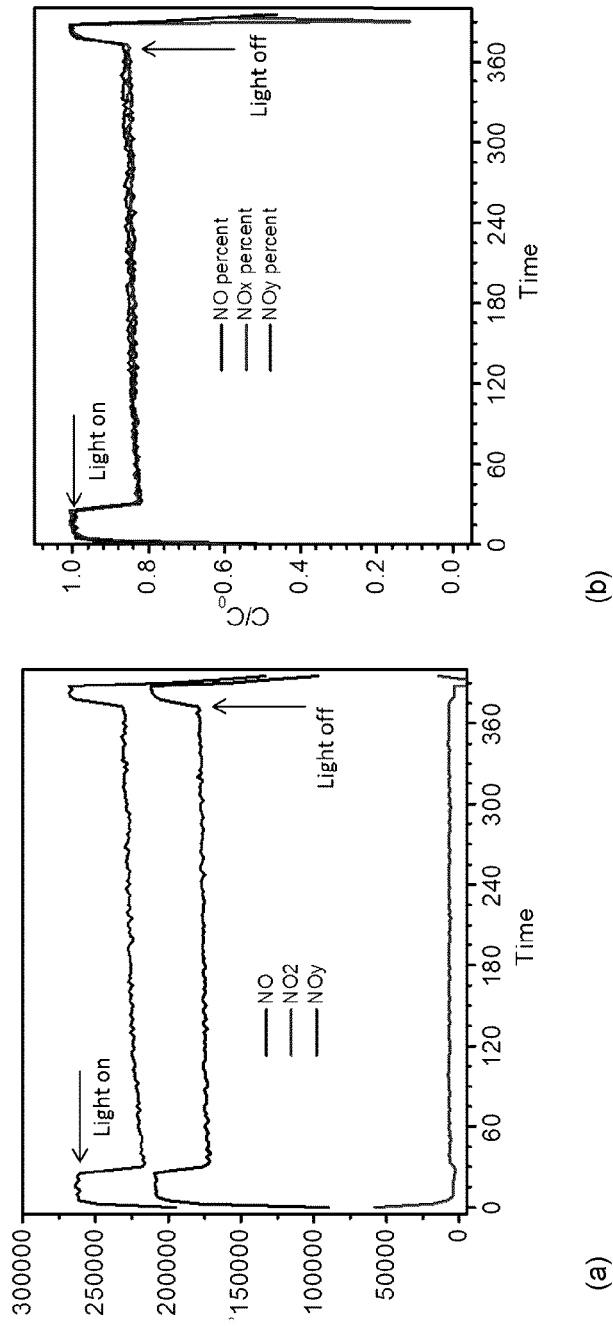
FIG. 6(a) is a graph showing average NO, $NO_2$, and $NO_y$ count traces during 6 hours light illumination for BiOBr/GO.
FIG. 6(b) is a graph showing NO, $NO_2$, and $NO_y$ conversion rates during 6 hours light illumination for BiOBr/GO.

BiOBr/GO only shows a photocatalytic decomposition rate of 17% to $NO_x$ at the beginning of the light illumination as shown in FIG. 6(a). It is stable during the whole measurement, and maintains the efficiency within the range of 17-15% through all 6 hours of light illumination as shown in FIG. 6(b). This measurement was repeated for a week.

Figure 7:
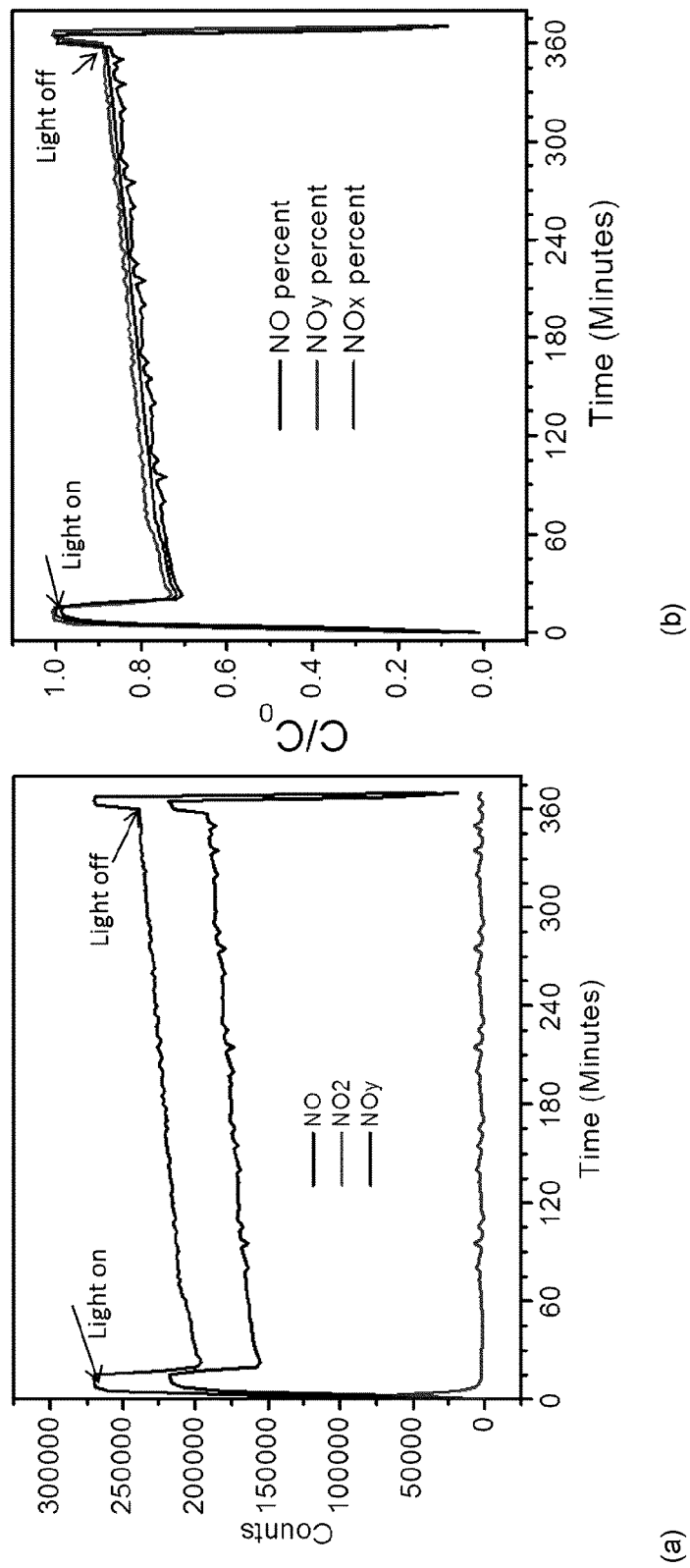
FIG. 7(a) is a graph showing average NO, $NO_2$, and $NO_y$ count traces during 6 hours light illumination for Fe—$TiO_2$.
FIG. 7(b) is a graph showing NO, $NO_2$, and $NO_y$ conversion rates during 6 hours light illumination for Fe—$TiO_2$.

(iii) Fe-doped $TiO_2$ 5 ml titanium isopropoxide (TTIP) was slowly added into 100 ml of 0.05 M water $Fe_2(SO_4)_3$ solution, and the pH was adjusted to 1.3 by 1 M $HNO_3$ solution. The as-formed milky solution was mixed at ~100° C. under magnetic stirring for 12 hours. The solvent was removed at 50-70° C. in a rotary evaporator. The obtained light yellow powder was dried at 80° C. overnight and then further baked at 450° C. for 2 hours to remove any organic impurities and to obtain better crystallinity. This resulted in a yellowish Fe-doped $TiO_2$ (Fe—$TiO_2$) powder. As shown in FIG. 7, Fe—$TiO_2$ coating shows photocatalytic $NO_x$ decomposition effect. At the beginning of light illumination, the NO, $NO_2$, and $NO_y$ decomposition rates are ~30%, 29%, and 28%, respectively. After 6 hours light illumination, the NO, $NO_2$, and $NO_y$ decomposition rates have all decreased to ~12%.

Figure 8:
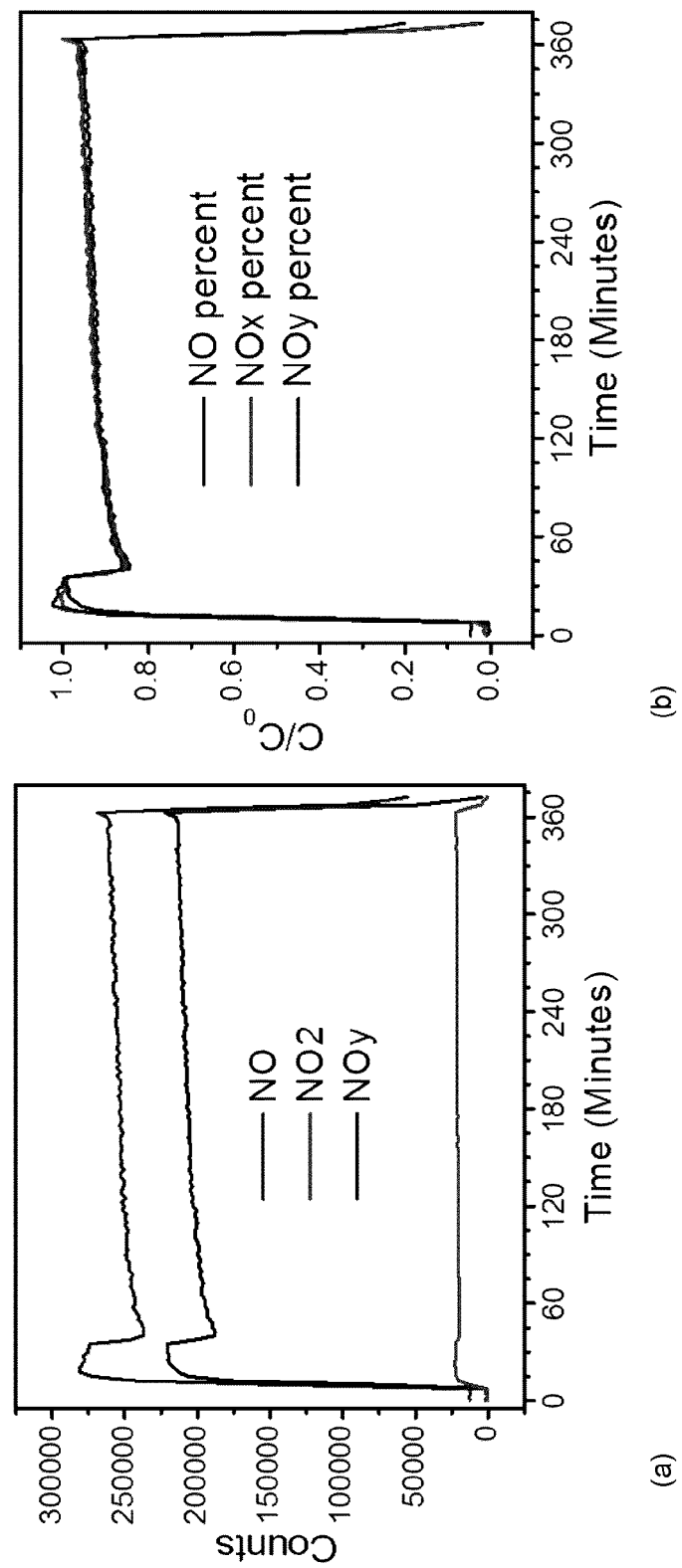
FIG. 8(a) is a graph showing average NO, $NO_2$, and $NO_y$ count traces during 6 hours light illumination for N—$TiO_2$.
FIG. 8(b) is a graph showing NO, $NO_2$, and $NO_y$ conversion rates during 6 hours light illumination for N—$TiO_2$.

(iv) N-doped $TiO_2$ 6.7 g TOS-d ($TiOSO_4$~15% wt % in diluted sulfuric acid), 4 g $H_2O$ and 11 g urea were mixed to form a solution. 7 g ethanol was added into the above solution and continuously stirred in an ice-water bath for 3-4 hours in order to obtain a homogeneous solution. The obtained solution was then heated at 80° C. for 5 h without stirring, resulting in a whitish precipitation that was collected and washed with $H_2O$ and ethanol three times. The precipitate was dried overnight at 80° C. in an oven to remove remaining solvents and ground into a powder that was further baked at 400° C.

for 2 hours, resulting a yellowish N-doped $TiO_2$ powder ($N-TiO_2$). As shown in FIG. 8, during the six hours light illumination, at the beginning of light illumination the NO, $NO_2$, and $NO_y$ decomposition efficiencies were all ~16%; and at the end of six hours, these efficiencies have dropped to ~5%.

Figure 9:
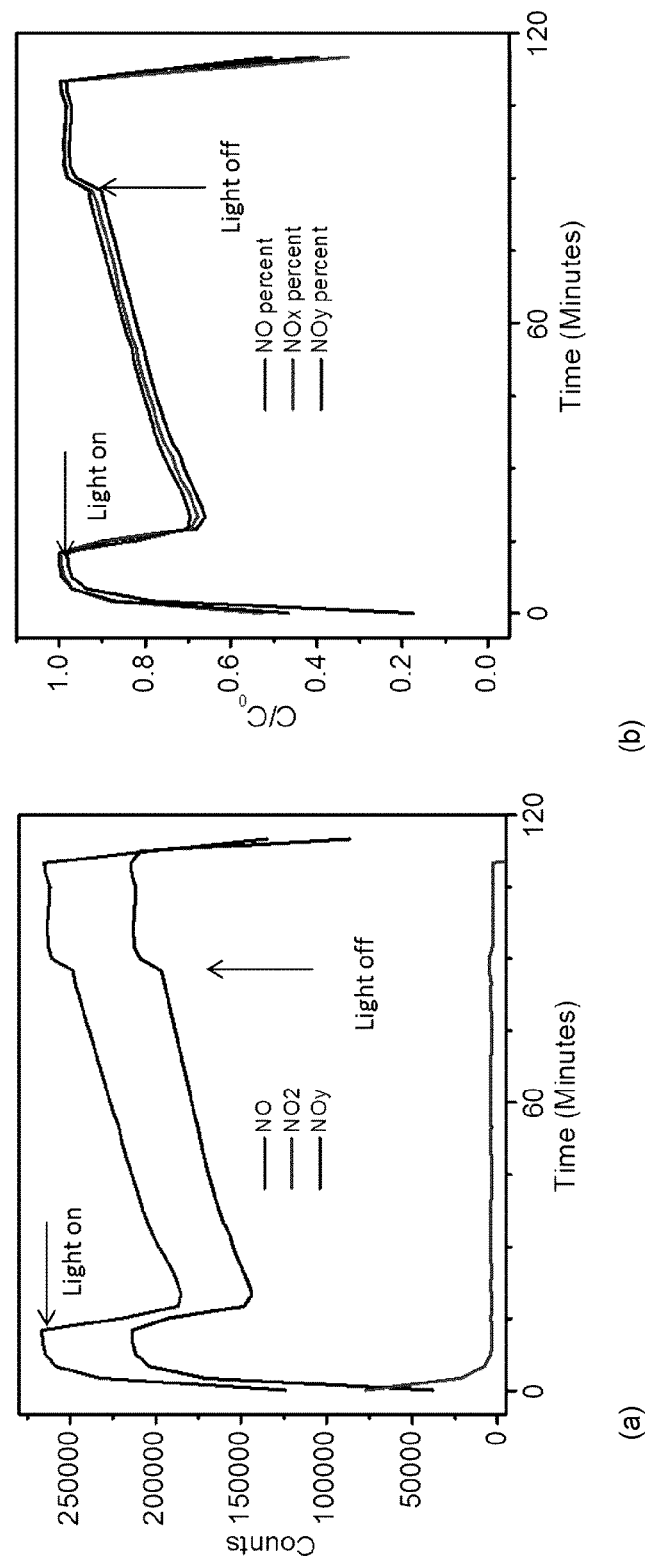
FIG. 9(a) is a graph showing average NO, $NO_2$, and $NO_y$ count traces during 6 hours light illumination for Cu—$TiO_2$.
FIG. 9(b) is a graph showing NO, $NO_2$, and $NO_y$ conversion rates during 6 hours light illumination for Cu—$TiO_2$.

(v) Cu-doped $TiO_2$ 1 ml TTIP was dissolved into 20 ml ethanol. The above solution was slowly added into 20 ml of a distilled water solution with pH adjusted to 1 by 1 M $H_2SO_4$ solution, resulting in a transparent gel. An amount of 0.1 M $Cu(NO_3)_2$ solution was added into the above gel solution such that the atomic ratio between Cu:Ti was 0.5%. The solution was refluxed at 80° C. for 12 hours, then rotary evaporated to dry the powder. The powder was further baked at 500° C. to obtain the final sample. As shown in FIG. 9, $Cu-TiO_2$ shows a high photocatalytic decomposition rate (34%) to $NO_x$ at the beginning of light on, but only after 1.5 hours the catalytic efficiency quickly drops to 10%.

Figure 10:
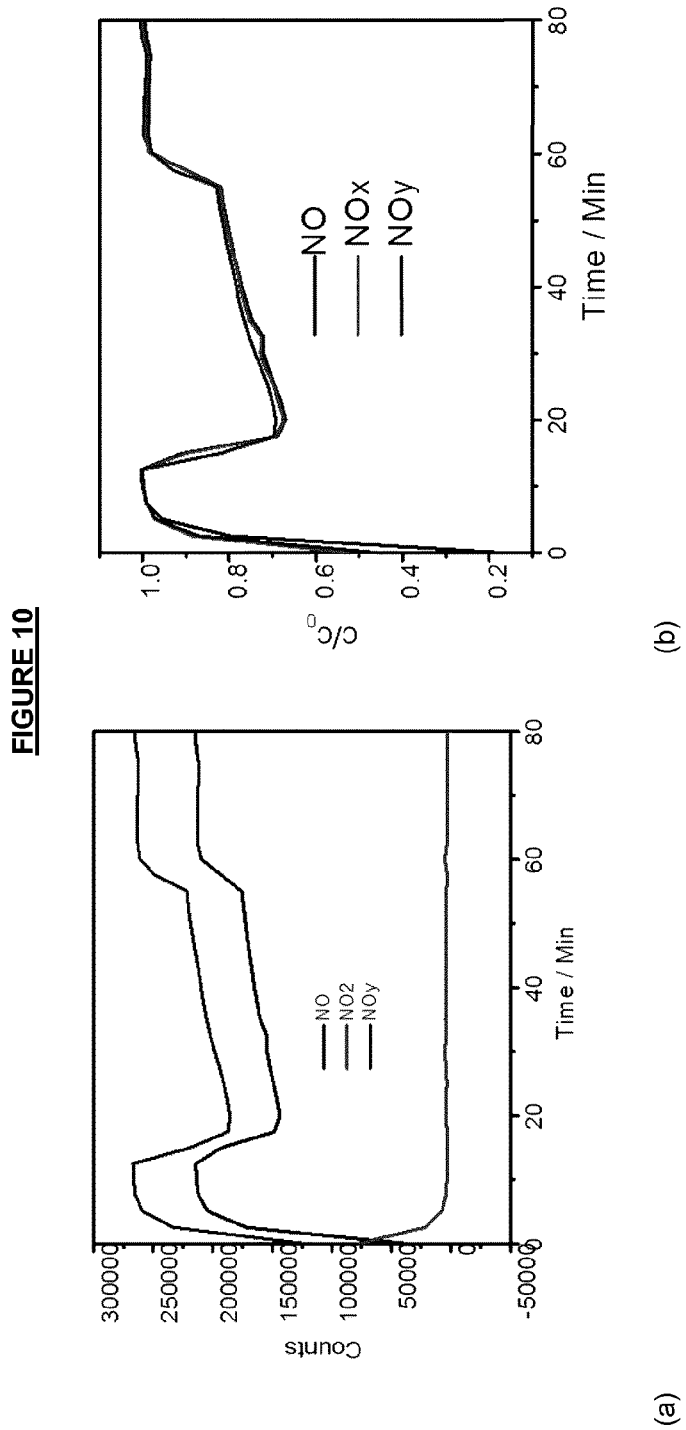
FIG. 10(a) is a graph showing average NO, $NO_2$, and $NO_y$ count traces during 6 hours light illumination for Cu/N—$TiO_2$.
FIG. 10(b) is a graph showing NO, $NO_2$, and $NO_y$ conversion rates during 6 hours light illumination for Cu/N—$TiO_2$.

(vi) Cu/N-Copdoped $TiO_2$ 1 g of synthesized $N-TiO_2$ (3) was dispersed into 5 ml of ethanol solution; 0.75 ml of 0.1 M $Cu(NO_3)_2$ solution was further added and stirred for 0.5 hours to get a homogeneous slurry, which was dried at 80° C. overnight, and then baked at 500° C. for 3 hours, resulting a yellowing Cu, $N-TiO_2$ powder. As shown in FIG. 10, Cu, N codoped-$TiO_2$ shows a high photocatalytic decomposition rate (30%) to $NO_x$ at the beginning of light on, but after only 40 minutes the catalytic efficiency quickly drops to 17%.

(vii) $ZnCdS/MoS_2$

Synthesis: The sample was synthesized through hydrothermal reactions. A $MoS_2$ nanosheet was prepared following the method below. 6 mmol of $Na_2MoO_4.2H_2O$, 30 mmol of thiourea and 60 mL of distilled water were added to a 100 mL Teflon-lined autoclave. The autoclave with the reactants was heated to 210° C. and kept at the temperature for 24 h. The autoclave was cooled to room temperature and the black precipitate was collected by centrifugation. The resulting solid was washed with distilled water 3 times and then dried in an oven at 70° C. for 24 h. Single- or few-layered graphene-like $MoS_2$ was prepared by exfoliation of $MoS_2$ in an organic solvent. In a typical experiment, 750 mg of $MoS_2$ was dispersed in 15 mL of methanol in a 100 mL flask. The mixture was sonicated for 2 h at room temperature, resulting in a dark brown suspension. The suspension was centrifuged for 10 min (2000 rpm) and the residue was removed by decantation. The concentration of as-prepared single- or few-layered graphene-like $MoS_2$ in the suspension was ca. 0.6 mg $mL^{-1}$.

ZnCdS component was prepared following the method below. 0.18 mmol zinc acetate ($Zn(Ac)_2.2H_2O$) and 0.42 mmol cadmium sulfate ($3CdSO_4.8H_2O$) were dissolved in 40 mL deionized water, then 20 mL of a 0.45 M sodium sulfide ($Na_2S.9H_2O$) solution was added dropwise under magnetic stirring. The mixture was transferred to a 100-mL Teflon-lined autoclave and heated at 180° C. for 10 h. The solid was isolated by centrifugation, washed with deionized water 3 times and dried at 70° C. The resultant samples were stored in the darkness before further use.

Figure 11:
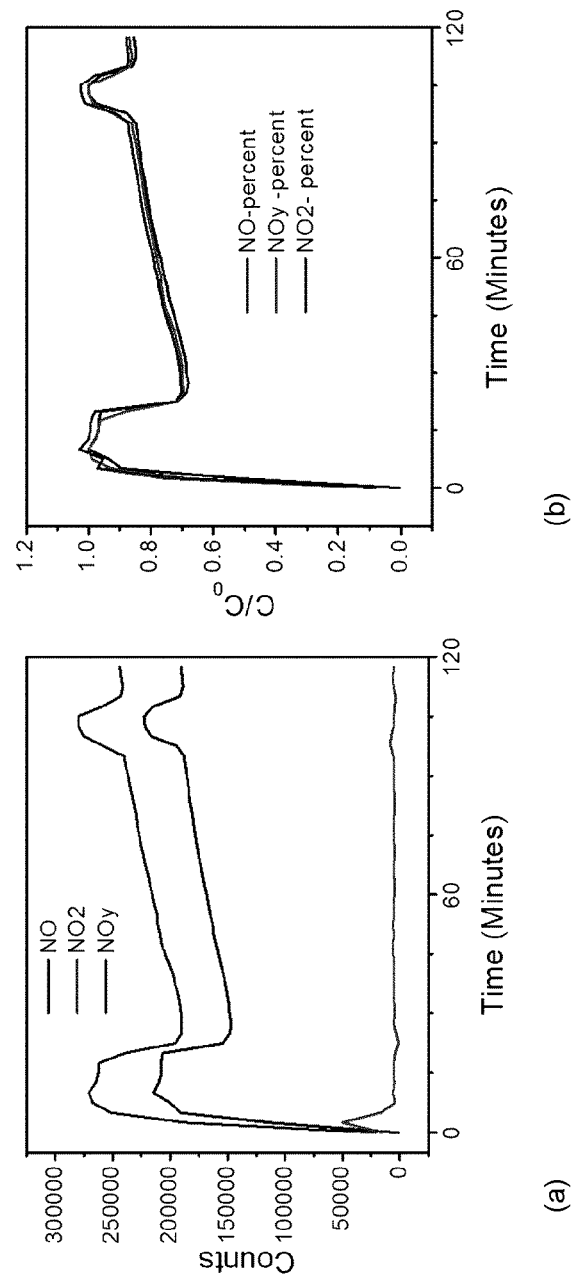
FIG. 11(a) is a graph showing average NO, $NO_2$, and $NO_y$ count traces during 6 hours light illumination for ZnCdS/$MoS_2$.
FIG. 11(b) is a graph showing NO, $NO_2$, and $NO_y$ conversion rates during 6 hours light illumination for ZnCdS/$MoS_2$.

The $ZnCdS/MoS_2$ composite was prepared by an ultrasonic mixing method. 0.33 g of the prepared ZnCdS sample was added to 50 mL methanol containing 3.3 mL of the $MoS_2$ suspension (ca. 2 mg $MoS_2$) and the mixture was ultrasonicated for another 2 hours. After that, the solvent was removed on a rotary evaporator at 40° C. The obtained lamellar solid was ground into a powder. The sample was stored in the darkness before used for the photocatalytic reactions. As shown in FIG. 11, $ZnCdS/MoS_2$ shows a high photocatalytic decomposition rate (30%) to $NO_x$ at the beginning of light on, but it drops quickly to 20% after 1.5 hours light illumination.

Example 5—$BiOBr/GO/TiO_2$

The composite synthesized in Example 1 was tested for its ability to reduce $NO_x$.

Figure 12:
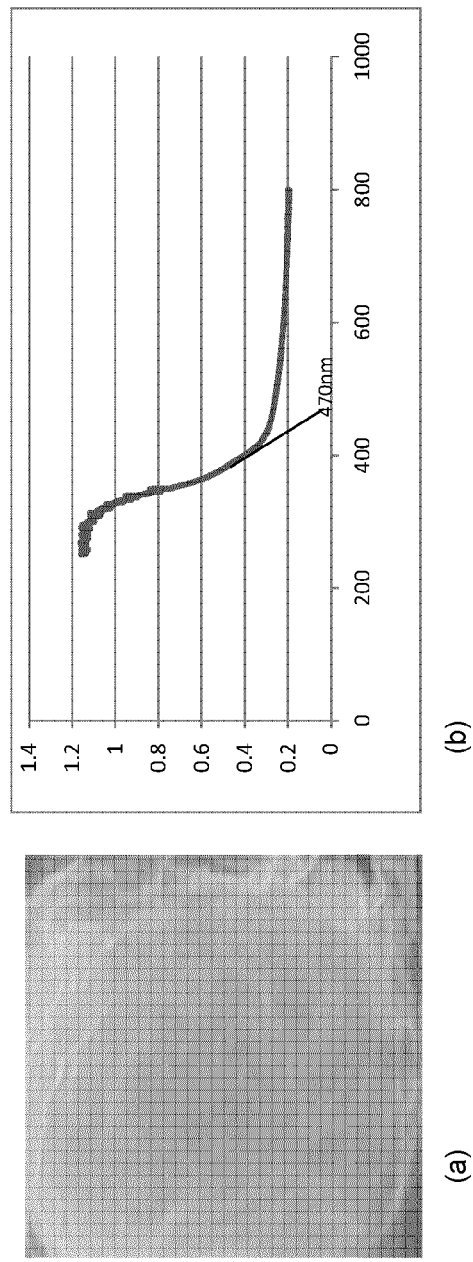

FIG. 12(*a*) shows the image of the composite on the acrylic. FIG. 12(*b*) shows the UV-Vis diffuse absorption spectrum of the prepared composite, and demonstrates that $BiOBr/GO-TiO_2$ has an extended absorption edge of 470 nm.

Figure 13:
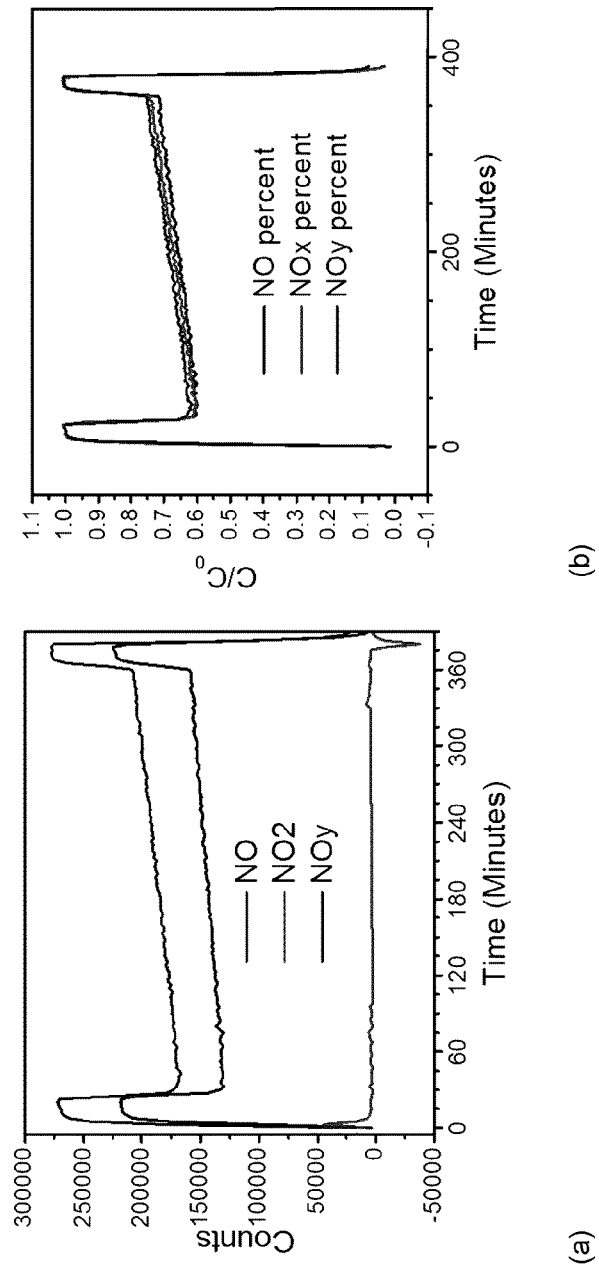

As shown in FIGS. 13(*a*) and 13(*b*), $BiOBr/GO-TiO_2$ composite shows very high efficiency for $NO_x$ removal with illumination (~40%). After approximately 6 hours of light illumination, the photocatalytic efficiency drops to 28% for $NO_x$. The repeated experiment shows that the efficiency recovers after overnight settling. The results of $NO_x$ removal for all of the catalysts are also shown in Table 1.

TABLE 1

NO decomposition efficiencies of various catalysts

| Catalyst | NO Decomposition rate (time 0) | NO Decomposition rate (6 hours)* |
|---|---|---|
| $TiO_2$-P25 | 36% | 13% |
| Fe—$TiO_2$ | 30% | 12% |
| Cu—$TiO_2$ | 34% | 10% (1.5 hours) |
| N—$TiO_2$ | 16% | 5% |
| Cu, N—$TiO_2$ | 30% | 20% (1 hour) |
| $ZnCdS/MoS_2$ | 30% | 13% (1.5 hours) |
| BiOBr/GO | 17% | 16% |
| BiOBr-GO/$TiO_2$-P25 | 40% | 28% |

FULL CITATIONS FOR DOCUMENTS REFERRED TO IN THE DESCRIPTION

1. Schneider, J., et al., *Understanding TiO2 Photocatalysis: Mechanisms and Materials.* Chemical Reviews, 2014. 114(19): p. 9919-9986.
2. Thiruvenkatachari, R., S. Vigneswaran, and I. Moon, *A review on UV/TiO2 photocatalytic oxidation process* (*Journal Review*). Korean Journal of Chemical Engineering, 2008. 25(1): p. 64-72.
3. Linsebigler, A. L., G. Lu, and J. T. Yates, *Photocatalysis on TiO2 Surfaces: Principles, Mechanisms, and Selected Results.* Chemical Reviews, 1995. 95(3): p. 735-758.
4. Fang, J., et al., *Bifunctional N-Doped Mesoporous TiO2 Photocatalysts.* The Journal of Physical Chemistry C, 2008. 112(46): p. 18150-18156.
5. Colon, G., et al., *Cu-doped TiO2 systems with improved photocatalytic activity.* Applied Catalysis B, Environmental, 2006. 67(1-2): p. 41-51.
6. Spadavecchia, F., et al., *Electronic Structure of Pure and N-Doped TiO2 Nanocrystals by Electrochemical Experiments and First Principles Calculations.* The Journal of Physical Chemistry C, 2011. 115(14): p. 6381-6391.
7. Kim, C.-S., et al., *Synthesis and characterization of Cu/N-doped mesoporous TiO2 visible light photocatalysts.* Applied Catalysis A: General, 2013. 455(0): p. 211-218.
8. Wu, Q. and R. van de Krol, *Selective Photoreduction of Nitric Oxide to Nitrogen by Nanostructured TiO2 Photo-* catalysts: *Role of Oxygen Vacancies and Iron Dopant.* Journal of the American Chemical Society, 2012. 134(22): p. 9369-9375.
9. Hua, X., et al., *Porous Ag3PO4 microtubes with improved photocatalytic properties.* Catalysis Communications, 2014. 52(0): p. 49-52.
10. Maeda, K. and K. Domen, *New Non-Oxide Photocatalysts Designed for Overall Water Splitting under Visible Light.* The Journal of Physical Chemistry C, 2007. 111 (22): p. 7851-7861.
11. Xu, X., et al., *A red metallic oxide photocatalyst.* Nat Mater, 2012. 11(7): p. 595-598.
12. Wang, X., et al., *A metal-free polymeric photocatalyst for hydrogen production from water under visible light.* Nat Mater, 2009. 8(1): p. 76-80.
13. Kim, D. W., et al., *Greenlighting Photoelectrochemical Oxidation of Water by Iron Oxide.* ACS Nano, 2014. 8(12): p. 12199-12207.
14. Shang, J., et al., *Bismuth Oxybromide with Reasonable Photocatalytic Reduction Activity under Visible Light.* ACS Catalysis, 2014. 4(3): p. 954-961.
15. Lu, Y., et al., *Coupling ZnxCd1-xS nanoparticles with graphene-like MoS2: superior interfacial contact, low overpotential and enhanced photocatalytic activity under visible-light irradiation.* Catalysis Science & Technology, 2014. 4: p. 2650-2657.
16. Ai, Z., W. Ho, and S. Lee, *Efficient Visible Light Photocatalytic Removal of NO with BiOBr-Graphene Nanocomposites.* The Journal of Physical Chemistry C, 2011. 115(51): p. 25330-25337.
17. Low, J., et al., *Two-dimensional layered composite photocatalysts.* Chemical Communications, 2014. 50(74): p. 10768-10777.
18. Wei, X, X., et al., Advanced visible-light-driven photocatalyst BiOBr—TiO$_2$-graphene composite with graphene as a nano-filler. Journal of Materials Chemistry A, 2014, 2, p. 4667-4675.

The invention claimed is:

1. A UV and/or visible-light photocatalytic composite material, the photocatalytic composite material comprising
   i) crystalline titanium dioxide; and
   ii) a first composite material comprising
       a) graphene oxide; and
       b) a bismuth-oxy halide of the formula Bi—O—X, wherein X is chloro, bromo or iodo.

2. The photocatalytic composite material of claim 1, wherein the material has a UV-vis absorption edge of about 470 nm.

3. The photocatalytic composite material of claim 1, wherein the titanium dioxide comprises anatase, rutile and/or brookite.

4. The photocatalytic composite material of claim 3, wherein the titanium dioxide comprises anatase and rutile.

5. The photocatalytic composite material of claim 4, wherein the titanium dioxide comprises anatase and rutile in a ratio of about 3:1.

6. The photocatalytic composite material of claim 1, wherein the bismuth-oxy halide is bismuth-oxybromide.

7. The photocatalytic composite of claim 1, wherein the titanium dioxide and the first composite material are present in a weight ratio of between about 0.5:1 to about 3:1.

8. The photocatalytic composite material of claim 7, wherein the titanium dioxide and the first composite material are present in a weight ratio of about 1:1.

9. The photocatalytic composite material of claim 1, wherein the graphene oxide further comprises graphene.

10. The photocatalytic composite material of claim 1, wherein the titanium dioxide is deposited on the first composite material.

11. The UV and/or visible-light photocatalytic composite material as claimed in claim 1 further comprising a solvent suitable to disperse the photocatalytic composite material.

12. The composition according to claim 11, wherein the solvent is $C_1$-$C_6$-alcohol, water or a combination thereof.

13. A method for the decomposition of airborne pollutants, the method comprising:
   a) coating a surface with a photocatalytic composite material as defined in claim 1; and
   b) exposing the surface to visible-light and/or UV-light for the decomposition of the airborne pollutants,
   wherein the airborne pollutants are $NO_x$ or volatile organic carriers.

14. The method of claim 13, wherein the surface is any surface which is in contact with an airborne pollutant.

15. The method of claim 13, wherein the surface is a roadway, tunnel, wall, concrete, pavement, automobile, or pollution control apparatus.

16. A UV and/or visible-light photocatalytic composite material, comprising
   a) crystalline titanium dioxide;
   b) graphene oxide; and
   c) a bismuth-oxy halide of the formula Bi—O—X, wherein X is chloro, bromo or iodo.

17. The photocatalytic composite material of claim 16, wherein the material has a UV-vis absorption edge of about 470 nm.

18. The photocatalytic composite material of claim 17, wherein the titanium dioxide comprises anatase, rutile and/or brookite.

19. The photocatalytic composite material of claim 16, wherein the bismuth-oxy halide is bismuth-oxybromide.

20. The photocatalytic composite material of claim 16, wherein the graphene oxide further comprises graphene.

* * * * *